United States Patent
Wu et al.

(10) Patent No.: US 9,118,769 B2
(45) Date of Patent: Aug. 25, 2015

(54) MOBILE PHONE AND METHOD FOR PROCESSING CALL SIGNAL THEREOF

(75) Inventors: Yanchun Wu, Huizhou (CN); Zihua Lin, Huizhou (CN)

(73) Assignee: HUIZHOU TCL MOBILE COMMUNICATION CO., LTD., Huizhou (CN)

( * ) Notice: Subject to any disclaimer, the term of this patent is extended or adjusted under 35 U.S.C. 154(b) by 0 days.

(21) Appl. No.: 14/119,408

(22) PCT Filed: Aug. 29, 2012

(86) PCT No.: PCT/CN2012/080701
§ 371 (c)(1),
(2), (4) Date: Nov. 21, 2013

(87) PCT Pub. No.: WO2013/053271
PCT Pub. Date: Apr. 18, 2013

(65) Prior Publication Data
US 2014/0213329 A1    Jul. 31, 2014

(30) Foreign Application Priority Data
Oct. 12, 2011  (CN) .......................... 2011 1 0308718

(51) Int. Cl.
*H04B 1/38* (2015.01)
*H04M 1/60* (2006.01)
*H04M 9/08* (2006.01)

(52) U.S. Cl.
CPC ............ *H04M 1/6058* (2013.01); *H04M 9/082* (2013.01)

(58) Field of Classification Search
CPC .. H04R 1/1083; H04R 2460/01; H04R 3/005; G10K 2210/1081

USPC .................. 455/569.1, 570, 501, 63.1, 67.13, 455/114.2, 135, 222, 278.1, 283; 381/370, 381/71.1, 94.1

See application file for complete search history.

(56) References Cited

U.S. PATENT DOCUMENTS 5,596,638 A * 1/1997 Paterson et al. ............ 455/575.2
7,647,077 B2 * 1/2010 Hui et al. ...................... 455/570
(Continued)

FOREIGN PATENT DOCUMENTS

| CN | 201199709 | 2/2009 |
| CN | 101420491 | 4/2009 |

(Continued)

OTHER PUBLICATIONS

Huangyan Ying, Xiexiang Yuan, Device and method for eliminating noise (Machine translation from Google Patent CN101989431A), Publication Date Mar. 23, 2011, pp. 1-4.*

*Primary Examiner* — Sonny Trinh
(74) *Attorney, Agent, or Firm* — Ladas & Parry LLP (57) ABSTRACT

The present invention discloses a method for processing a call signal of a mobile phone, the method includes detecting a current call state of the mobile phone; acquiring an environmental noise signal when the mobile phone enters an earphone call state; and performing a noise reduction processing to a call signal according to the environmental noise signal for acquiring a call signal with the noise reduction processing. The present invention further discloses a mobile phone. The present invention is capable of ensuring that a user is not affected by environmental noises for guaranteeing a better quality of a call when the user makes the call with an earphone.

15 Claims, 7 Drawing Sheets

(56) References Cited

U.S. PATENT DOCUMENTS

| | | | |
|---|---|---|---|
| 7,706,821 B2 * | 4/2010 | Konchitsky | 455/501 |
| 7,983,428 B2 * | 7/2011 | Ma et al. | 381/94.7 |
| 7,983,907 B2 * | 7/2011 | Visser et al. | 704/227 |
| 8,285,208 B2 * | 10/2012 | Terlizzi | 455/41.2 |
| 8,620,388 B2 | 12/2013 | Hayakawa et al. | |
| 8,774,875 B1 * | 7/2014 | Halferty et al. | 455/570 |
| 8,903,101 B2 * | 12/2014 | Christoph et al. | 381/71.6 |
| 2011/0002476 A1 | 1/2011 | Morishima et al. | |
| 2011/0014957 A1 * | 1/2011 | Sugimori et al. | 455/569.1 |

FOREIGN PATENT DOCUMENTS

| | | | |
|---|---|---|---|
| CN | 101827146 | 9/2010 | |
| CN | 101873363 | 10/2010 | |
| CN | 101989431 | 3/2011 | |
| CN | 101989431 A * | 3/2011 | G10L 21/02 |
| CN | 102368793 | 3/2012 | |
| EP | 2159791 | 3/2010 | |

* cited by examiner

MOBILE PHONE AND METHOD FOR PROCESSING CALL SIGNAL THEREOF

CROSS-REFERENCE TO RELATED APPLICATIONS

This application represents a National Stage application of PCT/CN2012/080701 entitled "Mobile Phone and Call Signal Processing Method for Same" filed August 29, pending.

BACKGROUND OF THE INVENTION

1. Field of the Invention

The present invention generally relates to a field of consumer electronics, and more particularly to a mobile phone and a method for processing a call signal thereof.

2. Description of Prior Art

With the rising of living standards, mobile phones are more and more popular in everyday life.

Being portable communication tools, mobile phones may be utilized in quiet nights, busy markets or everywhere else. In general, one mobile phone is provided with a headset pair. A user can hear audio signals played by the mobile phone via the headset. Moreover, the headset generally has an earphone microphone equipped therewith. The user further can utilize the headset and the earphone microphone to hear and transmit audio signals. Generally speaking, the headset equipped with the earphone microphone can be utilized to ensure a call to be proceeded even when the user cannot hold the mobile phone near the user's ear, this is especially important when the user is driving a car.

However, the user often utilizes the mobile phone to proceed a call in a noisy environment, and in this noisy environment, noises are inputted to the earphone microphone and transmitted to the other end of the call. In this case, the quality of the call is affected and the call can even be disrupted.

Consequently, a problem of reducing signals of the environmental noises for improving the quality of the call is required to be solved in the present technical field.

SUMMARY OF THE INVENTION

The present invention provides a mobile phone and a method for processing a call signal thereof capable of effectively reducing an environmental noise for improving quality of a call.

A technical scheme utilized for solving the technical problem is to provide a method for processing a call signal of a mobile phone, and the method comprises: a. detecting a current call state of the mobile phone for judging whether the mobile phone enters an earphone call state; b. utilizing a main microphone for acquiring a first environmental noise signal when the mobile phone enters the earphone call state; and c. performing a noise reduction processing to a call signal acquired by an earphone microphone according to the first environmental noise signal for acquiring a call signal with the noise reduction processing. In the step c, the noise reduction processing is performed according to the following equation:

$$S = L_1 - M_1.$$

Amongst, S is the call signal with the noise reduction processing. $L_1$ is the call signal acquired by the earphone microphone. $M_1$ is the first environmental noise signal acquired by the main microphone. The step b further comprises: utilizing a sub-microphone for acquiring a second environmental noise signal when the mobile phone enters the earphone call state.

Amongst, the step c further comprises: performing the noise reduction processing to the call signal acquired by the earphone microphone according to the first environmental noise signal and the second environmental noise signal for acquiring the call signal with the noise reduction processing.

Amongst, the noise reduction processing is performed according to the following equation in the step c:

$$S = L_1 - \frac{a \times M_1 + b \times M_2}{c}.$$

S is the call signal with the noise reduction processing. $L_1$ is the call signal acquired by the earphone microphone. $M_1$ is the first environmental noise signal acquired by the main microphone. $M_2$ is the second environmental noise signal acquired by the sub-microphone. Also, a, b and c are positive non-zero real numbers.

Amongst, an analog-to-digital conversion is performed to the call signal with the noise reduction processing in step c.

Amongst, the step c further comprises: adjusting values of a, b and c.

Another technical scheme utilized for solving the technical problem is to provide a method for processing a call signal of a mobile phone, and the method comprises: a. detecting a current call state of the mobile phone for judging whether the mobile phone enters an earphone call state; b. utilizing a main microphone for acquiring a first environmental noise signal when the mobile phone enters the earphone call state; and c. performing a noise reduction processing to a call signal acquired by an earphone microphone according to the first environmental noise signal for acquiring a call signal with the noise reduction processing.

Amongst, the noise reduction processing is performed according to the following equation in the step c:

$$S = L_1 - M_1.$$

Amongst, S is the call signal with the noise reduction processing. $L_1$ is the call signal acquired by the earphone microphone. $M_1$ is the first environmental noise signal acquired by the main microphone.

Amongst, the step b further comprises: utilizing a sub-microphone for acquiring a second environmental noise signal when the mobile phone enters the earphone call state. The step c further comprises: performing the noise reduction processing to the call signal acquired by the earphone microphone according to the first environmental noise signal and the second environmental noise signal for acquiring the call signal with the noise reduction processing.

Amongst, the noise reduction processing is performed according to the following equation in the step c:

$$S = L_1 - \frac{a \times M_1 + b \times M_2}{c}.$$

Amongst, S is the call signal with the noise reduction processing. $L_1$ is the call signal acquired by the earphone microphone. $M_1$ is the first environmental noise signal acquired by the main microphone. $M_2$ is the second environmental noise signal acquired by the sub-microphone. Also, a, b and c are positive non-zero real numbers.

Another technical scheme utilized for solving the technical problem is to provide a mobile phone, and the mobile phone comprises a main microphone and an earphone microphone pluggable on the mobile phone. The mobile phone further comprises: a baseband signal processing chip for detecting a current call state of the mobile phone for judging whether the mobile phone enters an earphone call state, the main microphone utilized for acquiring a first environmental noise signal when the mobile phone enters the earphone call state; and a noise reduction circuit for performing a noise reduction processing to a call signal acquired by the earphone microphone according to the first environmental noise signal for acquiring a call signal with the noise reduction processing.

Amongst, the noise reduction circuit performs the noise reduction processing according to the following equation:

$$S=L_1-M_1.$$

Amongst, S is the call signal with the noise reduction processing. $L_1$ is the call signal acquired by the earphone microphone. $M_1$ is the first environmental noise signal acquired by the main microphone.

Amongst, the noise reduction circuit is a subtractor.

Amongst, the mobile phone further comprises a sub-microphone. The sub-microphone is utilized for acquiring a second environmental noise signal when the baseband processing chip is further utilized for detecting that the mobile phone enters the earphone call state. The noise reduction circuit performs the noise reduction processing to the call signal acquired by the earphone microphone according to the first environmental noise signal and the second environmental noise signal for acquiring the call signal with the noise reduction processing.

Amongst, the noise reduction circuit performs the noise reduction processing according to the following equation:

$$S = L_1 - \frac{a \times M_1 + b \times M_2}{c}.$$

Amongst, S is the call signal with the noise reduction processing. $L_1$ is the call signal acquired by the earphone microphone. $M_1$ is the first environmental noise signal acquired by the main microphone. $M_2$ is the second environmental noise signal acquired by the sub-microphone. Also, a, b and c are positive non-zero real numbers.

Amongst, the noise reduction circuit comprises a subtractor, an adder and an inverter.

Distinguished from the prior arts, the mobile phone and the method for processing the call signal thereof of the present invention perform the noise reduction processing by utilizing the environmental noise signal for cancelling the environmental noise signal in the call signal acquired by the earphone microphone when the user makes a call with an earphone, thereby the user is not affected by the environmental noise signal to ensure a good quality of the call when the user makes the call with the earphone.

DETAILED DESCRIPTION OF THE INVENTION

Figure 1:
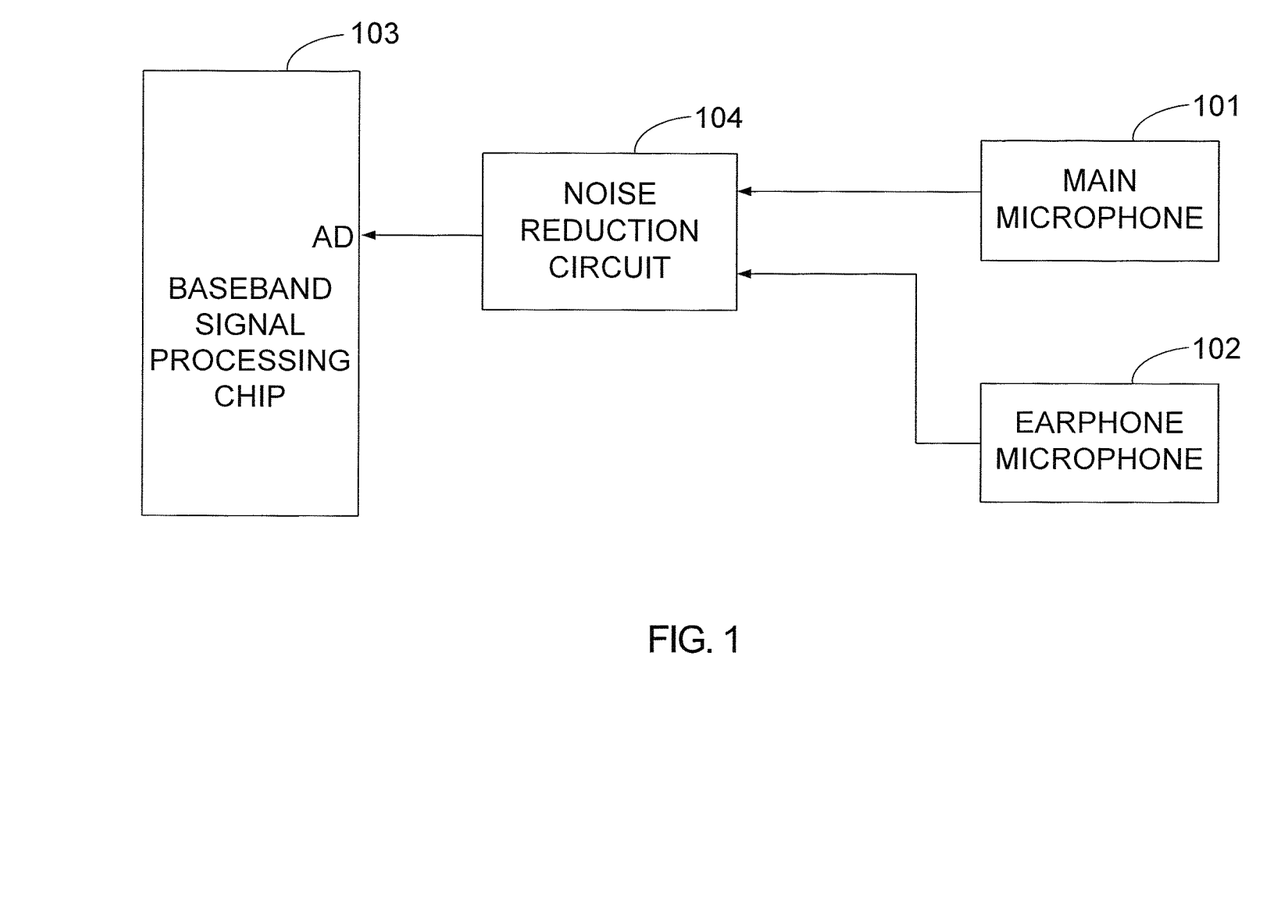
FIG. 1 is a circuit construction of a mobile phone in accordance with a first embodiment of the present invention.

Please firstly refer to FIG. 1. FIG. 1 is a circuit construction of a mobile phone in accordance with a first embodiment of the present invention. As shown in FIG. 1, the mobile phone of the present invention comprises a main microphone 101, an earphone microphone 102 pluggable on the mobile phone, a baseband signal processing chip 103 and a noise reduction circuit 104 in the present embodiment.

Amongst, the baseband signal processing chip 103 is utilized for detecting a current call state of the mobile phone for judging whether the mobile phone enters an earphone call state. When the mobile phone enters the earphone call state, the main microphone 101 is utilized for acquiring a first environmental noise signal. The noise reduction circuit 104 is utilized for performing a noise reduction processing to a call signal acquired by the earphone microphone 102 according to the first environmental noise signal for acquiring a call signal with the noise reduction processing.

Amongst, the call signal with the noise reduction processing may be inputted to an analog-to-digital conversion port AD of the baseband signal processing chip 103 for performing the following audio processing.

Figure 2:
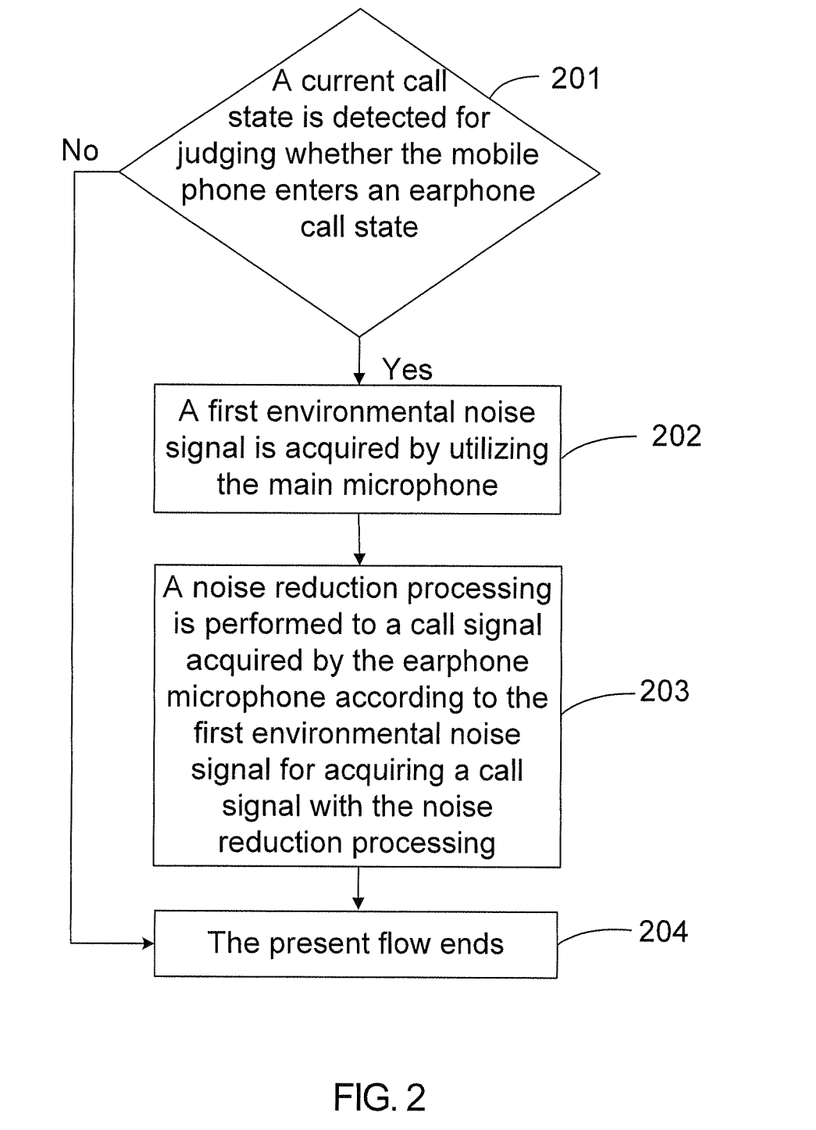
FIG. 2 is a flowchart of a method for processing a call signal of the mobile phone in accordance with a first embodiment of the present invention.

Please refer to FIG. 2. FIG. 2 is a flowchart of a method for processing a call signal of the mobile phone in accordance with a first embodiment of the present invention. As shown in FIG. 2, the method for processing the call signal of the mobile phone comprises the following steps in the present embodiment.

In Step 201, a current call state is detected for judging whether the mobile phone enters an earphone call state. When a judged result is "Yes", Step 202 is performed. Otherwise, Step 204 is performed.

In Step 202, a first environmental noise signal is acquired by utilizing the main microphone 101.

In Step 203, a noise reduction processing is performed to a call signal acquired by the earphone microphone 102 according to the first environmental noise signal for acquiring a call signal with the noise reduction processing.

In Step 204, the present flow ends.

Amongst, Step 201 is performed by the baseband signal processing chip 103. Step 202 is performed by the main microphone 101. Step 203 is performed by the noise reduction circuit 104.

In the above-mentioned Step 203, the noise reduction circuit 104 may perform the noise reduction processing according to the following equation:

$$S=L_1-M_1 \qquad (1).$$

In the equation (1), S is the call signal with the noise reduction processing. $L_1$ is the call signal acquired by the earphone microphone 102. $M_1$ is the first environmental noise signal acquired by the main microphone 101. Certainly, in an alternative embodiment, M1 may be multiplied by an adjustable coefficient with a specific numerical value for adjusting an amplitude of the first environmental noise signal, such that the acquired call signal S with the noise reduction processing can be adapted to different environments.

Figure 3:
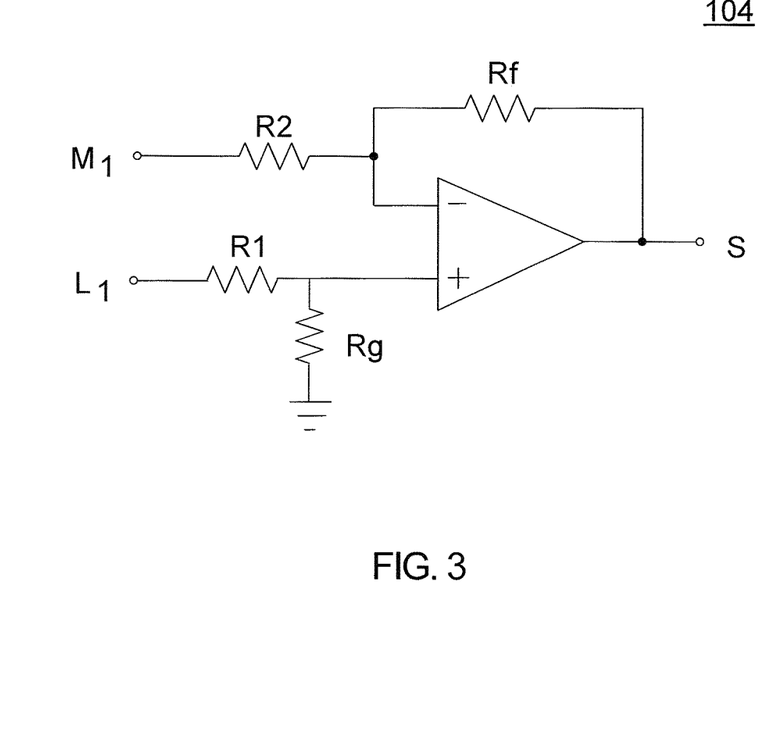
FIG. 3 is a circuit construction of a noise reduction circuit of the mobile phone in accordance with a first embodiment of the present invention.

Please refer to FIG. 3. FIG. 3 is a circuit construction of the noise reduction circuit 104 of the mobile phone in accordance with a first embodiment of the present invention. In the present embodiment, the noise reduction circuit 104 is a subtractor. As shown in FIG. 3, R1 is set to be equal to Rf, and R2 is set to be equal to Rg. The call signal L1 acquired by the earphone microphone 102 is served as a signal source of a subtrahend. The first environmental noise signal M1 acquired by the main microphone 101 is served as a signal source of a minuend. A subtraction processing is performed to the both in the subtractor.

$$S = L_1 - M_1. \quad (1)$$

Accordingly, the outputted signal S, which is acquired by subtracting the first environmental noise signal $M_1$ from the call signal $L_1$, is processed by the environmental noise reduction processing and thus call contents inputted from a user to the earphone microphone 102 can be clearly reflected.

Figure 4:
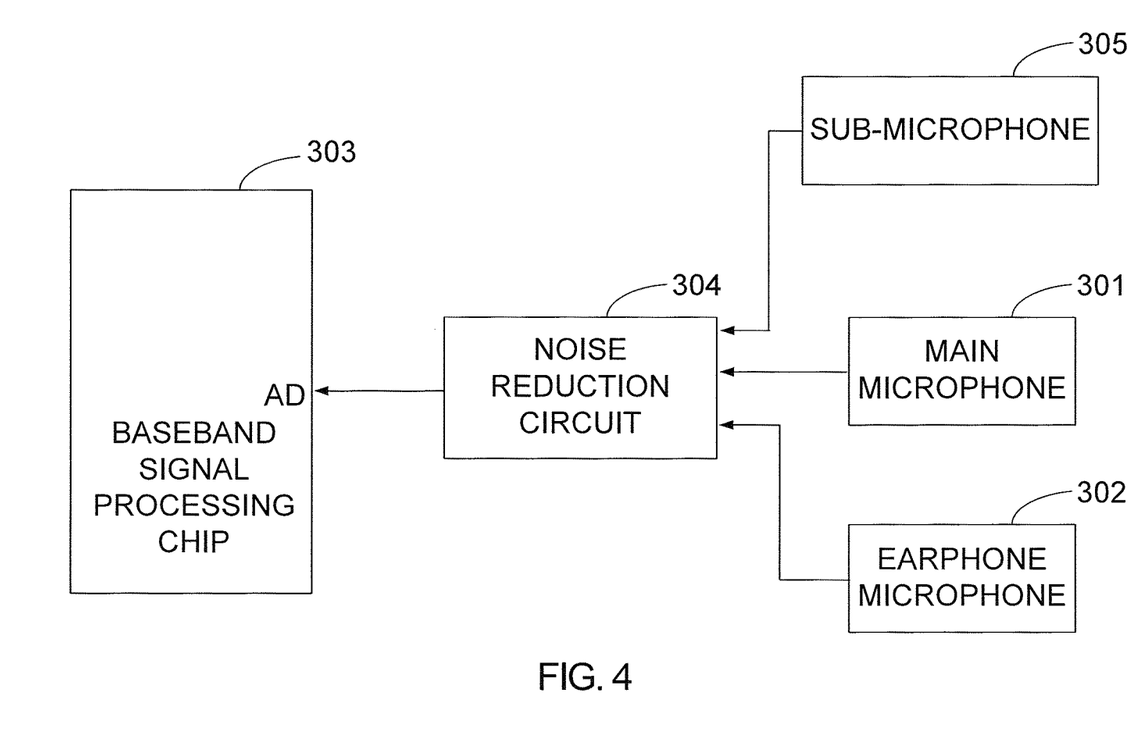
FIG. 4 is a circuit construction of a mobile phone in accordance with a second embodiment of the present invention.

Please refer to FIG. 4. FIG. 4 is a circuit construction of a mobile phone in accordance with a second embodiment of the present invention. As shown in FIG. 4, the mobile phone of the present invention comprises a main microphone 301, a sub-microphone 305, an earphone microphone 302 pluggable on the mobile phone, a baseband signal processing chip 303 and a noise reduction circuit 104 in the present embodiment.

The baseband signal processing chip 303 is utilized for detecting a current call state of the mobile phone for judging whether the mobile phone enters an earphone call state. When the mobile phone enters the earphone call state, the main microphone 301 is utilized for acquiring a first environmental noise signal and the sub-microphone 305 is utilized for acquiring a second environmental noise signal. The noise reduction circuit 304 is utilized for performing a noise reduction processing to a call signal acquired by the earphone microphone 302 according to the first environmental noise signal and the second environmental noise signal for acquiring a call signal with the noise reduction processing.

Amongst, the call signal with the noise reduction processing may be inputted to an analog-to-digital conversion port AD of the baseband signal processing chip 303 for performing the following audio processing.

Figure 5:
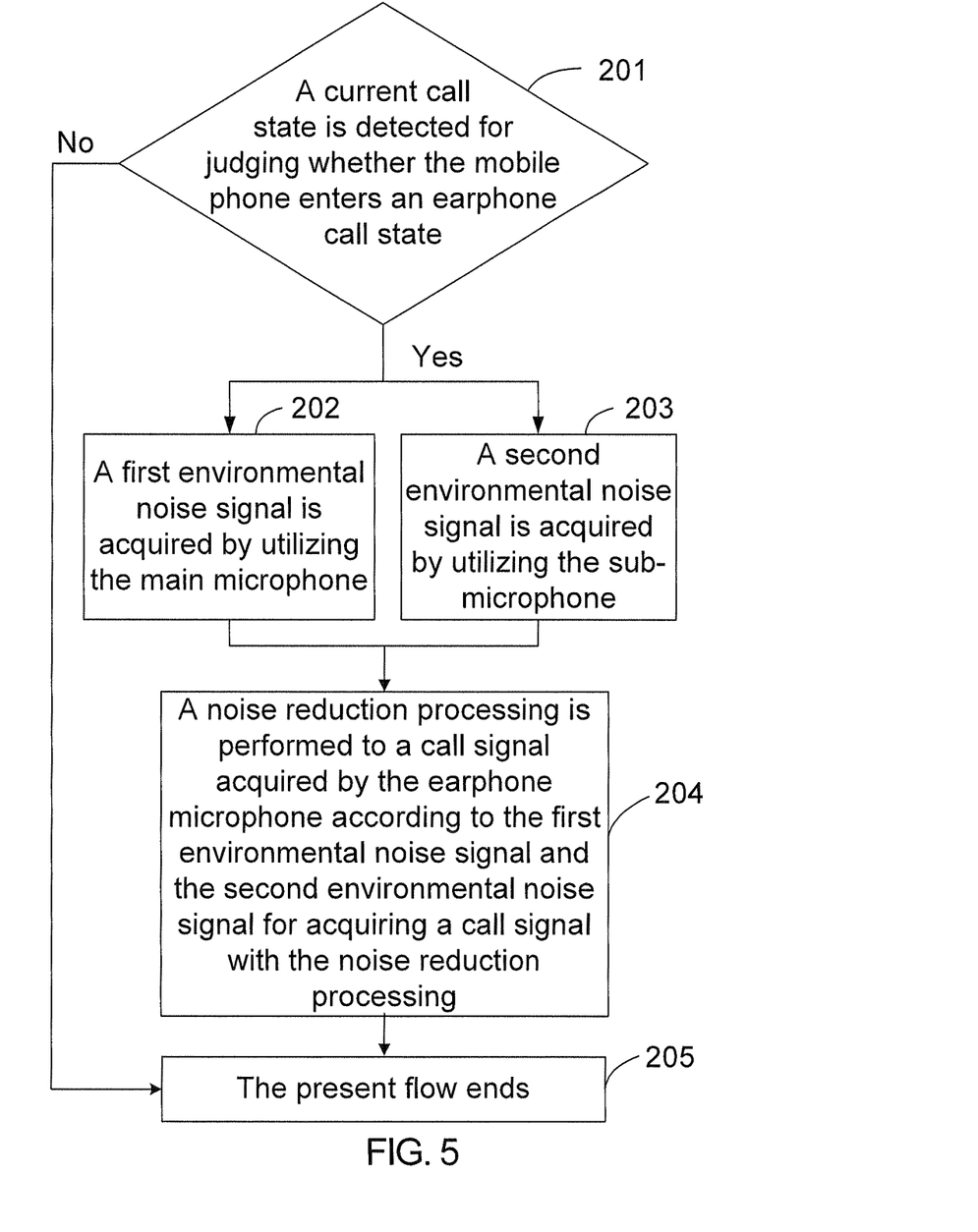
FIG. 5 is a flowchart of a method for processing a call signal of the mobile phone in accordance with a second embodiment of the present invention.

Please refer to FIG. 5. FIG. 5 is a flowchart of a method for processing a call signal of the mobile phone in accordance with a second embodiment of the present invention. As shown in FIG. 5, the method for processing the call signal of the mobile phone comprises the following steps in the present embodiment.

In Step 201, a current call state is detected for judging whether the mobile phone enters an earphone call state. When a judged result is "Yes", Step 202 and 203 are performed. Otherwise, Step 205 is performed.

In Step 202, a first environmental noise signal is acquired by utilizing the main microphone 301.

In Step 203, a second environmental noise signal is acquired by utilizing the sub-microphone 305.

In Step 204, a noise reduction processing is performed to a call signal acquired by the earphone microphone 302 according to the first environmental noise signal and the second environmental noise signal for acquiring a call signal with the noise reduction processing.

In Step 205, the present flow ends.

In the above-mentioned Step 204, the noise reduction circuit 304 may perform the noise reduction processing according to the following equation:

$$S = L_1 - \frac{a \times M_1 + b \times M_2}{c}. \quad (2)$$

Amongst, in the equation (2), S is the call signal with the noise reduction processing. $L_1$ is the call signal acquired by the earphone microphone 302. $M_1$ is the first environmental noise signal acquired by the main microphone 301. $M_2$ is the second environmental noise signal acquired by the sub-microphone 305. Also, a, b and c are positive non-zero real numbers. Amongst, selections of specific numerical values of a, b and c may be set by the noise reduction circuit 304 (will be described in detail below).

Figure 6:
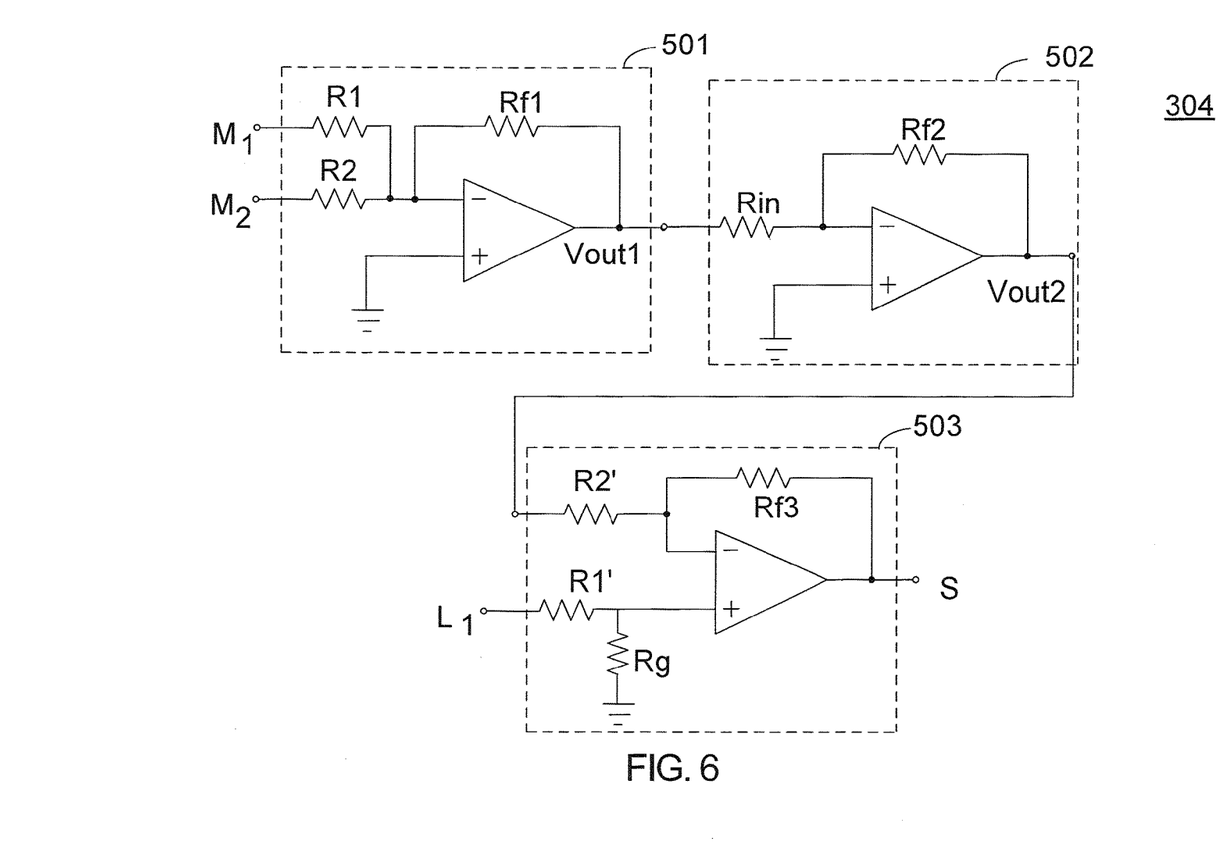
FIG. 6 is a circuit construction of the noise reduction circuit of the mobile phone in accordance with a second embodiment of the present invention.

Please refer to FIG. 6. FIG. 6 is a circuit construction of the noise reduction circuit 304 of the mobile phone in accordance with a second embodiment of the present invention. In the present embodiment, the noise reduction circuit 304 comprises an adder 501, an inverter 502 and a subtractor 503. As shown in FIG. 6, the first environmental noise signal $M_1$ and the second environmental noise signal $M_2$ are served as signal sources and inputted to the adder 501. An output Vout1 of the adder 501 is as follows:

$$Vout1 = -\left(\frac{Rf1}{R1} \times M_1 + \frac{Rf1}{R2} \times M_2\right).$$

Amongst, the following equation can be acquired by adjusting proportions of Rf1, R1 and R2:

$$\frac{Rf1}{R1} \times M_1 + \frac{Rf1}{R2} \times M = \frac{a \times M_1 + b \times M_2}{c}.$$

Accordingly, $$Vout1 = -\left(\frac{Rf1}{R1} \times M_1 + \frac{Rf1}{R2} \times M_2\right)$$
$$= -\frac{a \times M_1 + b \times M_2}{c}.$$

Accordingly, the values of a, b and c are determined by Rf1, R1 and R2. Generally, a is set to be equal 1, b is set to be equal to 1, and c is set to be equal to 2. Certainly, depending on a practical usage environment, the values of a, b and c may be adjusted according to practical requirements, and they are not particularly limited in the present invention.

Vout1 may be served as a signal source and inputted to the inverter 502. In the inverter 502, Rin is set to be equal to Rf2, such that the following equation can be acquired:

$$Vout2 = -Vout1$$
$$= \frac{Rf1}{R1} \times M_1 + \frac{Rf1}{R2} \times M_2$$
$$= \frac{a \times M_1 + b \times M_2}{c}.$$

Vout2 may be served as a signal source of a subtrahend. The call signal L1 acquired by the earphone microphone 302 is served as a signal source of a minuend of the subtractor 503. In the subtractor 503, R2' is set to be equal to Rf3, and R1' is set to be equal to Rg. In the meanwhile, the output S of the subtractor 503 meets the following equation:

$$S = L_1 - Vout2 \qquad (2)$$
$$= L_1 - \frac{a \times M_1 + b \times M_2}{c}.$$

Accordingly, a computed result from the equation (2) can be acquired by the noise reduction circuit 304 as shown in FIG. 6.

It is noted that the noise reduction circuit 304 of the present invention may be served as a peripheral circuit for connecting to the baseband signal processing chip 303 or may be integrated with the baseband signal processing chip 303 or integrated with a coded chip. The noise reduction circuit 304 is not limited in the present invention.

Figure 7:
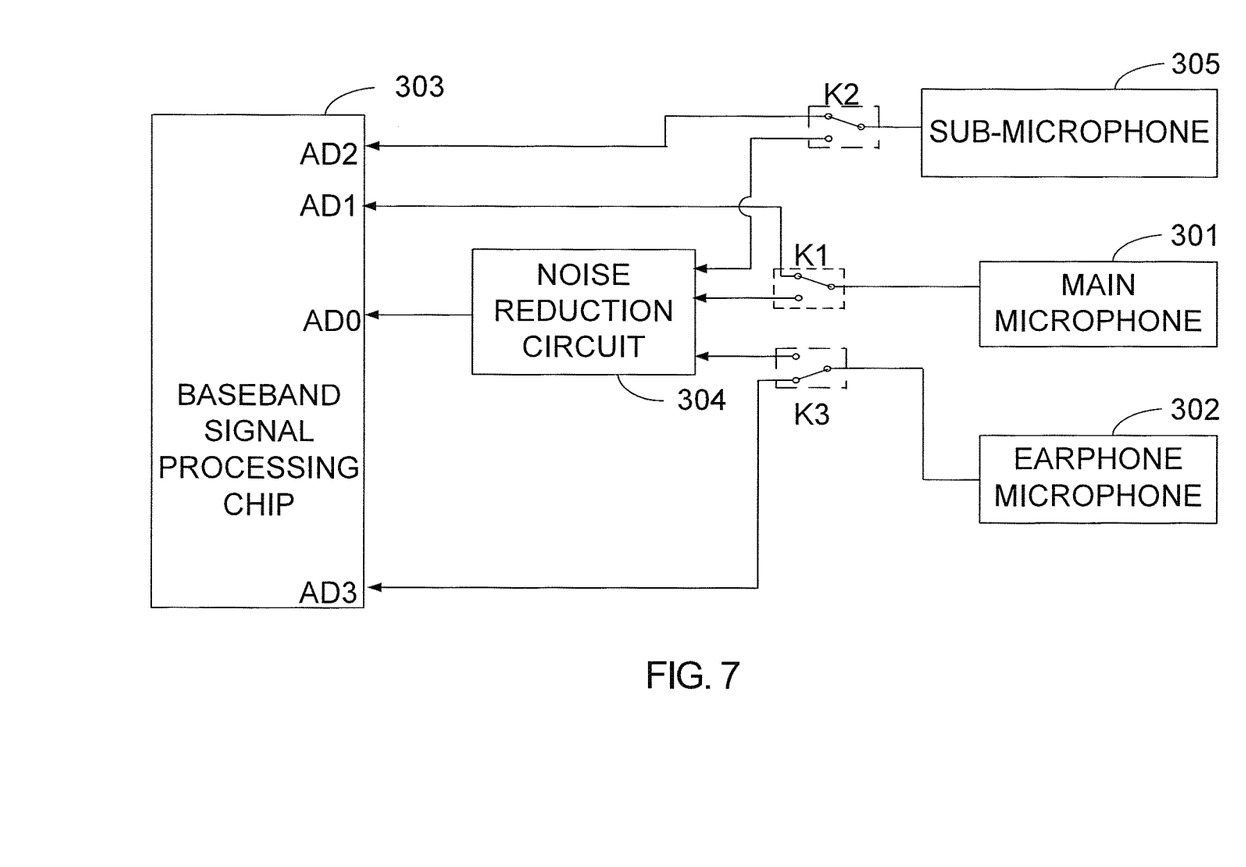
FIG. 7 is a circuit construction of a mobile phone in accordance with a third embodiment of the present invention.

Please refer to FIG. 7. FIG. 7 is a circuit construction of a mobile phone in accordance with a third embodiment of the present invention. As shown in FIG. 7, the third embodiment of the present invention further describes an embodiment for selecting passes of the sub-microphone 305, the main microphone 301 and the earphone microphone 302 based on the second embodiment.

As shown in FIG. 7, a controlled switch K1 is disposed among the main microphone 301, the noise reduction circuit 304 and the baseband signal processing chip 303. The controlled switch K1 can be chosen to connect the main microphone 301 to the noise reduction circuit 304 or chosen to connect the main microphone 301 to an analog-to-digital conversion port AD1 of the baseband signal processing chip 303 by a control signal. As a result, the audio signal acquired by the main microphone 301 can be selectively transmitted to the baseband signal processing chip 303 or the noise reduction circuit 304 by the above-mentioned disposal. Similarly, operation modes of controlled switches K2 and K3 are the same as the above and not repeated herein.

Accordingly, when the user makes a call with an earphone, the mobile phone and the method for processing the call signal thereof of the present invention perform the noise reduction processing by utilizing the environmental noise signal for cancelling the environmental noise signal in the call signal acquired by the earphone microphone through the above-mentioned technical schemes, thereby ensuring that the user is not affected by the environmental noise signal for guaranteeing the quality of the call when the user makes the call with the earphone.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. A method for processing a call signal of a mobile phone, comprising:
   a. detecting a current call state of the mobile phone for judging whether the mobile phone enters an earphone call state;
   b. utilizing a main microphone for acquiring a first environmental noise signal when the mobile phone enters the earphone call state, wherein the step b further comprises:
      utilizing a sub-microphone for acquiring a second environmental noise signal when the mobile phone enters the earphone call state; and
   c. performing a noise reduction processing to a call signal acquired by an earphone microphone according to the first environmental noise signal for acquiring a call signal with the noise reduction processing,
   wherein the noise reduction processing is performed according to the following equation in the step c:

$$S = L_1 - M_1,$$

where S is the call signal with the noise reduction, $L_1$ is the call signal acquired by the earphone microphone, and $M_1$ is the first environmental noise signal acquired by the main microphone.

2. The method of claim 1, wherein the step c further comprises:
   performing the noise reduction processing to the call signal acquired by the earphone microphone according to the first environmental noise signal and the second environmental noise signal for acquiring the call signal with the noise reduction processing.

3. The method of claim 2, wherein the noise reduction processing is performed according to the following equation in the step c:

$$S = L_1 - \frac{a \times M_1 + b \times M_2}{c},$$

where S is the call signal with the noise reduction processing, $L_1$ is the call signal acquired by the earphone microphone, $M_1$ is the first environmental noise signal acquired by the main microphone, $M_2$ is the second environmental noise signal acquired by the sub-microphone, and a, b and c are positive non-zero real numbers.

4. The method of claim 3, wherein the step c further comprises:
   performing an analog-to-digital conversion to the call signal with the noise reduction processing.

5. The method of claim 4, wherein the step c further comprises:
   values of a, b and c are adjustable according to a practical usage environment.

6. A method for processing a call signal of a mobile phone, comprising:
   a. detecting a current call state of the mobile phone for judging whether the mobile phone enters an earphone call state;
   b. utilizing a main microphone for acquiring a first environmental noise signal when the mobile phone enters the earphone call state; and
   c. performing a noise reduction processing to a call signal acquired by an earphone microphone according to the first environmental noise signal for acquiring a call signal with the noise reduction processing,
   wherein the first environmental noise signal is multiplied by an adjustable coefficient with a specific numerical value for adjusting an amplitude of the first environmental noise signal.

7. The method of claim 6, wherein the noise reduction processing is performed according to the following equation in the step c:

$$S = L_1 - M_1,$$

where S is the call signal with the noise reduction processing, $L_1$ is the call signal acquired by the earphone microphone, and $M_1$ is the first environmental noise signal acquired by the main microphone.

8. The method of claim 6, wherein the step b further comprises:
utilizing a sub-microphone for acquiring a second environmental noise signal when the mobile phone enters the earphone call state; and
the step c further comprises:
performing the noise reduction processing to the call signal acquired by the earphone microphone according to the first environmental noise signal and the second environmental noise signal for acquiring the call signal with the noise reduction processing.

9. The method of claim 8, wherein the noise reduction processing is performed according to the following equation in the step c:

$$S = L_1 - \frac{a \times M_1 + b \times M_2}{c},$$

where S is the call signal with the noise reduction processing, $L_1$ is the call signal acquired by the earphone microphone, $M_1$ is the first environmental noise signal acquired by the main microphone, $M_2$ is the second environmental noise signal acquired by the sub-microphone, and a, b and c are positive non-zero real numbers.

10. A mobile phone, comprising a main microphone and an earphone microphone pluggable on the mobile phone, wherein the mobile phone further comprises:
a baseband signal processing chip for detecting a current call state of the mobile phone for judging whether the mobile phone enters an earphone call state, the main microphone utilized for acquiring a first environmental noise signal when the mobile phone enters the earphone call state; and
a noise reduction circuit for performing a noise reduction processing to a call signal acquired by the earphone microphone according to the first environmental noise signal for acquiring a call signal with the noise reduction processing,
wherein the first environmental noise signal is multiplied by an adjustable coefficient with a specific numerical value for adjusting an amplitude of the first environmental noise signal.

11. The mobile phone of claim 10, wherein the noise reduction circuit performs the noise reduction processing according to the following equation:

$$S = L_1 - M_1,$$

where S is the call signal with the noise reduction processing, $L_1$ is the call signal acquired by the earphone microphone, and $M_1$ is the first environmental noise signal acquired by the main microphone.

12. The mobile phone of claim 11, wherein the noise reduction circuit is a subtractor.

13. The mobile phone of claim 10, wherein the mobile phone further comprises a sub-microphone, the sub-microphone is utilized for acquiring a second environmental noise signal when the baseband processing chip is further utilized for detecting that the mobile phone enters the earphone call state, and the noise reduction circuit performs the noise reduction processing to the call signal acquired by the earphone microphone according to the first environmental noise signal and the second environmental noise signal for acquiring the call signal with the noise reduction processing.

14. The mobile phone of claim 13, wherein the noise reduction circuit performs the noise reduction processing according to the following equation:

$$S = L_1 - \frac{a \times M_1 + b \times M_2}{c},$$

where S is the call signal with the noise reduction processing, $L_1$ is the call signal acquired by the earphone microphone, $M_1$ is the first environmental noise signal acquired by the main microphone, $M_2$ is the second environmental noise signal acquired by the sub-microphone, and a, b and c are positive non-zero real numbers.

15. The mobile phone of claim 14, wherein the noise reduction circuit comprises:
an adder for receiving the first environmental noise signal and the second environmental noise signal and generating an output based on first environmental noise signal and the second environmental noise signal;
an inverter for receiving the output of the adder and generating an inversion of the output; and
an subtractor for receiving the inversion of the output and the call signal acquired by the earphone microphone and generating the call signal with the noise reduction processing.

* * * * *